United States Patent
Goode et al.

(10) Patent No.: US 7,801,172 B2
(45) Date of Patent: *Sep. 21, 2010

(54) DATA PACKET STRUCTURE FOR DIGITAL INFORMATION DISTRIBUTION

(75) Inventors: Christopher W. B. Goode, Menlo Park, CA (US); Yong Ho Son, Palo Alto, CA (US); Danny Chin, Princeton Junction, NJ (US); Steve Zack, Burlington, NJ (US)

(73) Assignee: Charter Communications Operating, LLC, St. Louis, MO (US)

( * ) Notice: Subject to any disclaimer, the term of this patent is extended or adjusted under 35 U.S.C. 154(b) by 1734 days.

This patent is subject to a terminal disclaimer.

(21) Appl. No.: 10/946,393

(22) Filed: Sep. 21, 2004

(65) Prior Publication Data

US 2005/0041664 A1 Feb. 24, 2005

Related U.S. Application Data

(63) Continuation of application No. 09/458,339, filed on Dec. 10, 1999, now Pat. No. 6,826,197.

(60) Provisional application No. 60/127,336, filed on Apr. 1, 1999.

(51) Int. Cl.
*H04J 3/16* (2006.01)

(52) U.S. Cl. .......... 370/466; 370/389; 370/474

(58) Field of Classification Search ........ 370/352, 370/353, 355, 356, 389, 392, 395.43, 395.5, 370/395.52, 395.6, 465, 466, 469, 470, 471, 370/474; 709/230, 231, 236; 710/30

See application file for complete search history.

(56) References Cited

U.S. PATENT DOCUMENTS

| 5,179,548 | A | | 1/1993 | Sandesara | 370/16.1 |
| 5,218,604 | A | | 6/1993 | Sosnosky | 370/85.14 |
| 5,327,427 | A | | 7/1994 | Sandesara | 370/85.14 |
| 5,742,599 | A | * | 4/1998 | Lin et al. | 370/395.65 |
| 5,892,910 | A | * | 4/1999 | Safadi | 709/217 |
| 6,522,651 | B2 | * | 2/2003 | Herrmann | 370/395.2 |
| 7,342,941 | B2 | * | 3/2008 | Jungers et al. | 370/471 |
| 7,346,054 | B2 | * | 3/2008 | Chen et al. | 370/390 |
| 7,349,386 | B1 | * | 3/2008 | Gou | 370/356 |

FOREIGN PATENT DOCUMENTS

EP 1460853 A1 * 9/2004

* cited by examiner

*Primary Examiner*—Donald L Mills
(74) *Attorney, Agent, or Firm*—Wall & Tong, LLP

(57) ABSTRACT

A data packet structure capable of efficiently propagating a payload through a multi-user, digital video distribution system. The system is capable of delivering multimedia data (video and audio information) using the Moving Picture Expert Group (MPEG) packets as payload within a unique packet structure. The packet structure enables routing of the packets through a variety of network topologies. Specifically, the packet structure comprises a packet header, a routing information field, a private data field, digital data payload, and an error correction code field. Such a packet structure enables the network to deliver digital video through a point-to-point, star, ring, dual ring, and other network topologies to a user that is identified in the routine information field.

17 Claims, 2 Drawing Sheets

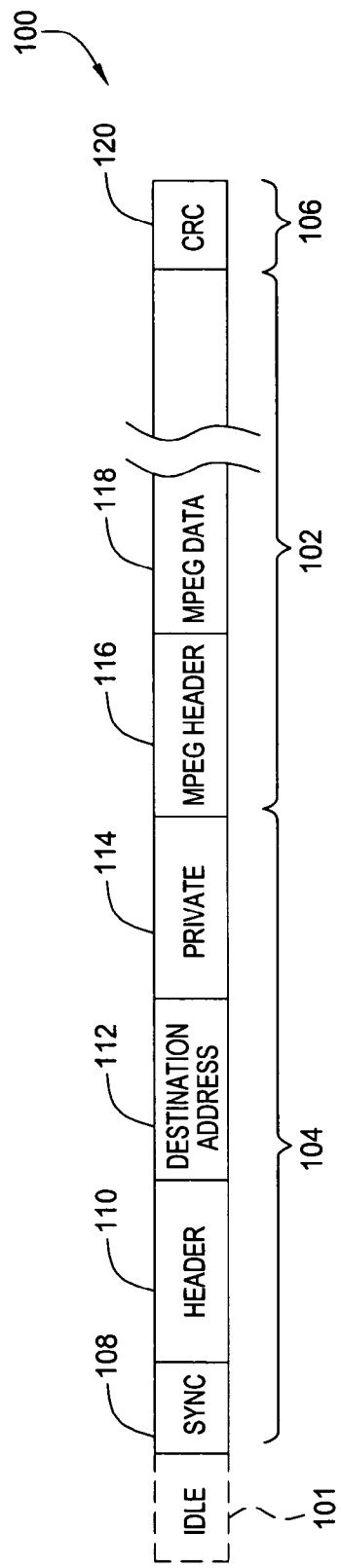
FIG. 1
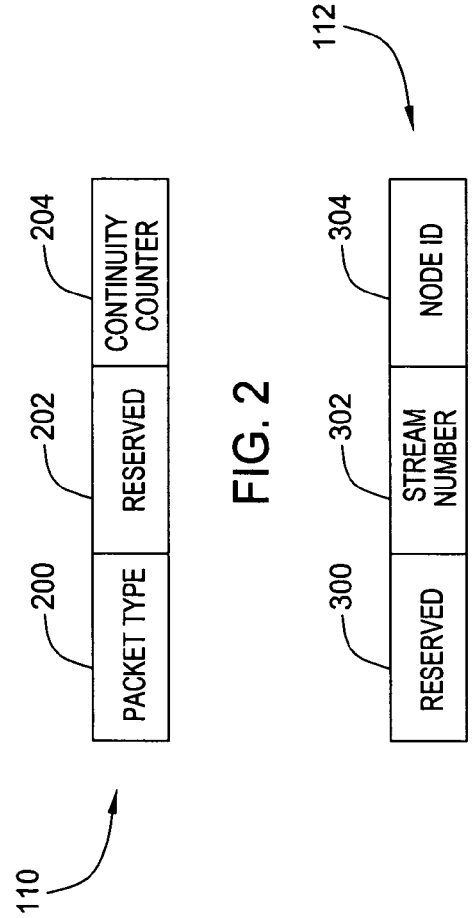

DATA PACKET STRUCTURE FOR DIGITAL INFORMATION DISTRIBUTION

CROSS-REFERENCE TO RELATED APPLICATIONS

This application is a continuation of U.S. patent application Ser. No. 09/458,339, filed Dec. 10, 1999, now U.S. Pat. No. 6,826,197 currently allowed, which application claims the benefit of U.S. Provisional Application No. 60/127,336 filed Apr. 1, 1999, which applications are herein incorporated by reference; and this application contains subject matter that is related to the disclosure in U.S. Pat. No. 6,639,896, issued Oct. 28, 2003, which is herein incorporated by reference.

BACKGROUND OF THE DISCLOSURE

1. Field of the Invention

The invention relates to digital information distribution systems and, more particularly, the invention relates to a data packet structure for routing digital information through a multi-user network.

2. Description of the Background Art

Digital information, including digital video, can be distributed through networks that utilize asynchronous transfer mode (ATM) and packet over SONET. However, both of these types of data distribution systems are not cost effective for providing digital video distribution and require significant bandwidth overhead for each respective packet format plus configuration and control overhead for the network. A more efficient network solution for simplex, point-to-point transmission and delivery of Moving Pictures Experts Group (MPEG) packets is known as DVB-ASI (Digital Video Broadcast/Asynchronous Serial Interface). DVB-ASI is described in European Standard EN 50083 entitled "Cable Distribution System for Television, Sound, and Interactive Multimedia Signals", March 1997. This specification defines a protocol for distributing digital video in the form of MPEG packets at a rate of 270 Mbps. The actual data carriage under this protocol is 216 Mbps. Although the DVB-ASI protocol is well suited for simplex, point-to-point communications, a system based on this protocol is not capable of supporting high speed data transmissions that are necessary for multi-user digital video distribution systems. Furthermore, because of the limited data carrying capability, the DVB-ASI protocol does not efficiently utilize the bandwidth that is available for optical fiber based systems, i.e., a bandwidth that exceeds 1 Gbps.

Therefore, there is a need in the art for a protocol for multi-user, digital information distribution system that provides high speed transmissions, e.g., more than a gigabit per second, in conjunction with a low overhead.

SUMMARY OF THE INVENTION

The disadvantages associated with the prior art are overcome by a data packet structure capable of efficiently propagating a payload through a multiple source, multiple sink digital information distribution system. The system is capable of delivering multimedia data (video and audio information) using the Moving Picture Expert Group (MPEG-2) transport packets as payload within a unique packet structure. This same packet structure is used to carry data, such as internet protocol data. The packet structure enables routing of the packets through a variety of network topologies. Specifically, the packet structure comprises a packet header, a destination address field, a private data field, digital information payload, and an error correction code field. Such a packet structure enables the network to deliver digital information through a point-to-point, star, ring, dual ring, and other network topologies to a user that is identified in the routine information field.

BRIEF DESCRIPTION OF THE DRAWINGS

The teachings of the present invention can be readily understood by considering the following detailed description in conjunction with the accompanying drawings, in which:

FIG. 1 depicts a packet structure of the present invention;

FIG. 2 depicts the packet header field of the packet structure of FIG. 1;

FIG. 3 depicts the destination address field of the packet structure of FIG. 1.

To facilitate understanding, identical reference numerals have been used, where possible to designate identical elements that are common to the figures.

DETAILED DESCRIPTION

Figure 4:
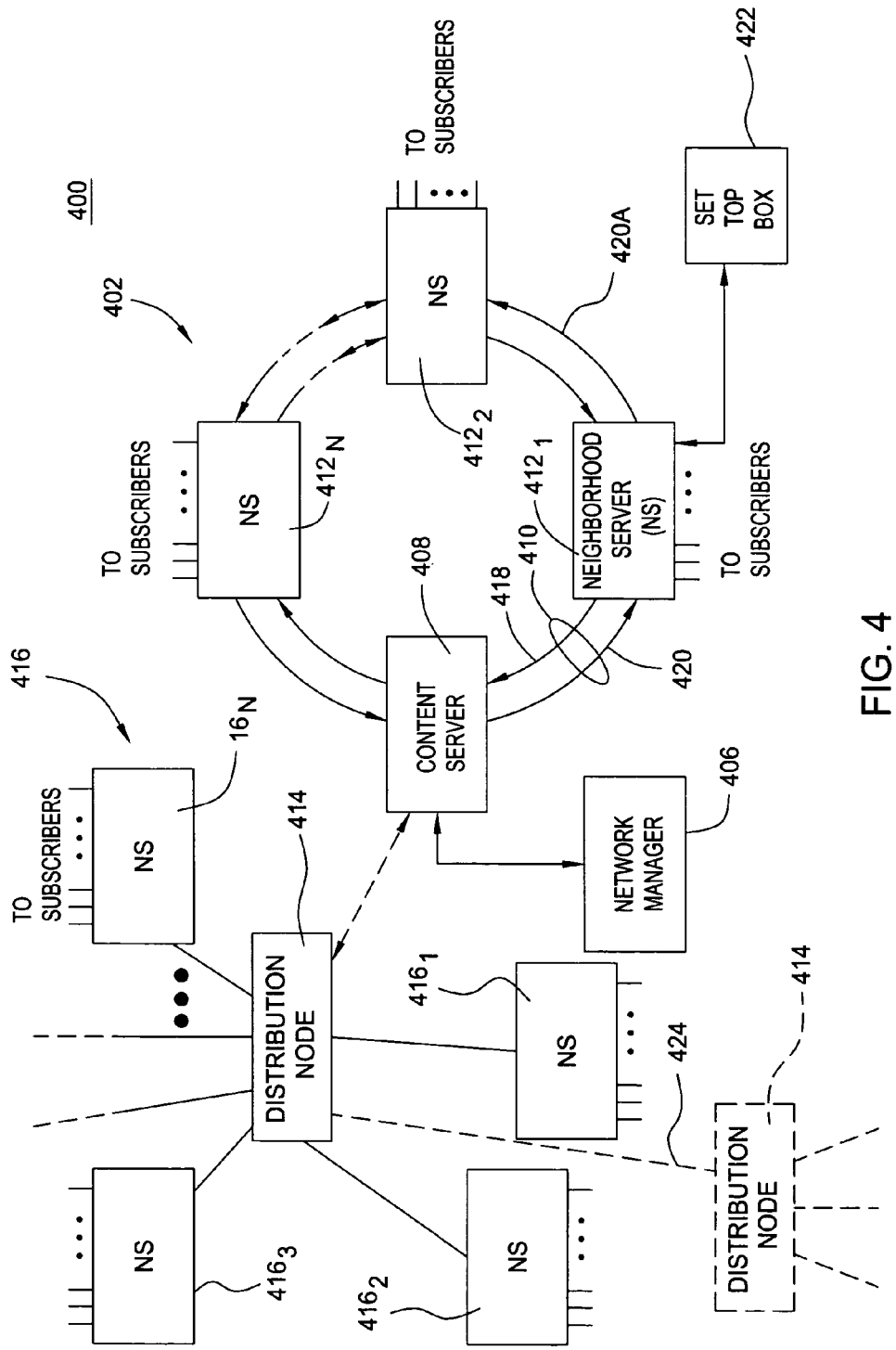
FIG. 4 depicts an illustrative switched network capable of routing digital video information to users using the packet structure of FIG. 1.

The present invention extends the existing DVB-ASI protocol to improve the transmission bit rate, support duplex communications, support multipoint-to-multipoint communications, provide a flexible packet structure that can support packet routing or packet switching network architectures, and enable a variety of network topologies to be used for multiple source, multiple sink data distribution. The present invention comprises a packet structure 100 as shown in FIGS. 1, 2 and 3 and a multi-user video data distribution network as shown in FIG. 4.

This packet structure facilitates high bandwidth data streaming of constant bit rate (CBR), variable bit rate (VBR) and undefined bit rate (UBR) data. CBR data is typically used for audio and video, VBR data can be used for video to take advantage of the compression of movies such that certain scenes are compressed more or less than other scenes, and UBR data is used for internet protocol (IP) data. For each of these data types, the packet structure can be used to implement quality of service such that the network can simultaneously handle various types of services and adapt the services in response to network congestion. For example, if the network is congested to a point where CBR can not be guaranteed to each user, the packet structure can be used to send data in a UBR manner and video in a CBR manner. As such, using a quality of service technique, certain services can be guaranteed a particular bandwidth for a particular connection.

The packet structure is typically transmitted through a network in a serial format, then the packet is converted into a parallel format upon being received at a network node. The two formats have identical fields; however, in the parallel format an IDLE character field 101 is removed from the serial packet format.

The packet structure 100 of both the serial and parallel formatted packets comprises a payload portion 102, a header portion 104 and a trailer portion 106. The payload portion 102 is 188 bytes in length to accommodate an MPEG-2 transport packet. Within the 188 bytes are 4 bytes of header information 116 and 184 bytes of MPEG data 118. There are 12 bytes of information in the header portion 104 and 4 bytes that are placed as an extended trailer portion 120. To handle errors in transmission the trailer portion 120 comprises a 4 byte cyclical redundant code (CRC) field. The CRC value is used for error detection and correction.

An IDLE or comma character (defined as the K28.5 character according to the 8B/10B encoding specification) appears in the IDLE field 101 in front of every packet. The field is only present in the serial packet format. These comma characters are used by the network nodes to obtain the frame boundary locations of the packets. A minimum of two comma characters is required by the DVB-ASI specification. At least four comma characters are transmitted between each packet initially because hardware requires four consecutive comma characters to obtain initial synchronization. In the event that synchronization is lost (due to a cable being temporarily disconnected for example), the use of four comma characters allows resynchronization to occur within one packet time. More efficient use of bandwidth can occur by inserting comma codes less frequently than before each packet. The cost of less frequent comma codes is that, upon synchronization loss, the network will require more MPEG packets to be lost (not routed properly) while the network nodes await enough comma codes to resynchronize.

The header portion 104 comprises a 1 byte sync field 108, a 3 byte packet header 110, a 4 byte destination address field 112, and a 4 byte private data field 114. The sync field 108 is one byte in length and has a value that facilitates packet synchronization.

The packet header 110 provides synchronization information that is used by routing switches in the network nodes to route the packet and by a depacketizer at a user's location to extract the payload information from the packet 100. The packet header field 110 is composed of three bytes as shown in FIG. 2. The header 110 provides packet type information 200 to identify the type of packet which will be used to determine how the bytes in the packet should be interpreted. There are eight undefined bits in the reserved sub-field 202 that can be used for future enhancements since this sub-field is not used at the current time. The continuity counter sub-field 204 is similar in function to the continuity counter field defined in the MPEG-2 specification in that sequential packets within a stream (comprising audio, video and program specific information data) have this value incremented by one.

The packet type sub-field 200 is used to distinguish between different types of payload contained with the packet 100. The types of packets include data packets carrying real-time MPEG data, data packets carrying MPEG data using flow control, IP packets, in-band message packets, and reserved values.

The data packets for real-time MPEG data contain MPEG data for real-time streams. No flow control or throttling of the data is defined in the protocol for real-time MPEG streams, thus any errors in transmission will result in a packet being dropped at the user equipment. This is deemed necessary for streaming video and audio. The packet type field equals 16(0x10).

The data packets carrying MPEG data with flow control contain MPEG data being routed through the network using some type of flow control performed by software at a higher level. This is performed for content introduction or content migration (i.e., movement of video content from one video server to another). In these situations it is very important to be able to recognize if a packet(s) has been dropped somewhere in the network. Since this data is being written to disk, e.g., for many iterations of subsequent playing of this locally stored movie, the network must be able to guarantee that all the data actually arrived at the destination.

Internet protocol (IP) data that is formatted into the payload portion 102 is identified because some nodes might process these packets differently. For instance, a routing switch has the ability to transfer IP packets through the in-band port when bandwidth is available on the port, i.e., no data packets are being transferred. In one embodiment of the invention, the IP packet is contained within the 184 byte data field 118 of the MPEG data packet while an MPEG header 116 remains before the data. This form of payload, an MPEG header plus IP data is referred to as IP over MPEG. In alternative embodiment of the invention, the entire payload portion 104 carries IP data, i.e., 188 bytes of IP data. Within the routing switch the switch controller processor will be responsible for formatting a single IP packet into multiple payload portions 102. For IP packet transmission, the IP packets are encapsulated using LLC/SNAP encapsulation and the encapsulated packets are than segmented into payload portion sized packets for insertion into the payload portion 118 of the MPEG packet 102. The packet type field will equal 18 (0x12).

Special messages that require low latency between nodes are sent through an in-band connection. Examples are user migration messages, timestamp synchronization messages, "ping" messages, etc. These are used when a message does not need to incur the overhead or processing power required for IP messages. The packet type field is in the range between 128 (0x80) and 191 (0xBF).

Packets with a packet type sub-field between 0 and 15 and from 192 to 254 are reserved for future use.

The private data field 114 (a reserved vendor specific field) contains application specific data that facilitates payload handling. For example, in a video distribution system, the private data identifies the title identification codes (TIC) that are associated with specific programs being transported in the payload portion 104. The title identification code (TIC) field 114 is used to perform stream integrity checking on a packet-by-packet basis for data packets only. At some nodes within the system, when a data packet is received, the received TIC is compared to the expected TIC to verify that the correct content is being received. The expected TIC is stored in a lookup table that is indexed by the destination address from the received packet. When the TIC stored in the table matches the received TIC, then the packet has been received correctly, otherwise, an error has occurred and the packet needs to be removed from the stream. For non-data packets such as IP packets or in-band messages, this field will be reserved for future use. A possible use would be to store the source address of the packet.

FIG. 3 depicts the destination address field 112. The destination address field 112 is used to route the packet 100 to the proper destination node. This field is also used by the destination endpoint node to identify the packet so that it can be processed correctly. Every destination node in the network must have a unique address and the stream going to that particular address must be uniquely identified. The field 112 is 32 bits long and comprises a 4 bit reserved sub-field 300, a 12 bit stream number sub-field 302 and a 16 bit node ID sub-field 304. The reserved sub-field is preserved for future use.

The node ID sub-field 304 is a 16-bit identifier that provides a unique address for every node in the system. This allows for a maximum of 65,536 different nodes to exist within a network. A packet's node ID will be examined by a node in the network to determine if the received packet is intended to be processed by that node. If the node ID field in the packet does not match the node's own node ID contained in memory then the packet needs to be routed to another node.

When this is the case, the received node ID accesses a lookup table that provides the routing information and any other associated data for that packet.

When the received node ID field does match the node's own node ID, then the packet is intended to be removed from the network and processed by that node. The stream number sub-field 302 which is described below, is then used to index a table to provide information specific to that particular stream.

The node ID for a particular node in the network is assigned when the node initially logs onto the system. When a device is first powered up, it must make its presence known to the network so that the device can receive a node ID. Once it receives its node ID, the device can then communicate with other devices on the network.

The stream number subfield 302 is a 12-bit identifier that is assigned by the destination node to uniquely identify a data stream being sent to that node. This allows for a maximum of 4096 streams to be processed by any individual node. This field is used in conjunction with the node ID to uniquely identify a packet in the network.

When using the packet structure 100 in a switched network, such as an ATM-like network, the destination address field 112 carries information that is used to define a virtual path identifier and/or a virtual channel identifier. As such, the destination address field information facilitates routing of the packet through a plurality of switches that form the network.

The MPEG data field 118 contains the encoded MPEG-2 transport stream that is being delivered to the destination node. For non-data packets such as IP packets, the IP packets are encapsulated and divided into multiple payload portions 102.

For IP packet transmission, the IP packets are encapsulated using LLC/SNAP encapsulation and the encapsulated packets are then segmented into payload portion sized packets for insertion into the payload portion 102 of the packet 100. These reformatted IP packets are inserted at the origination switch in place of null packets. The destination field information used for these packets is used to route the IP data through the network. At the destination end, the last switch extracts the data carrying packets and reassembles them back to IP packets. A virtual LAN concept is supported by IP packets that are routed through the network in this manner.

In one embodiment of the inventive packet structure, the CRC-32 field 120 protects against bit errors being introduced within the network. A standard 32-bit Ethernet polynomial is used. The CRC is computed on all 200 bytes of the packet preceding the CRC. In alternative embodiments of the inventive packet structure, the trailing 4 byte field 120 forms a vendor specific field that may contain information used to support particular vendor equipment.

FIG. 4 depicts a multi-user (subscriber) video distribution network 400. To illustrate the flexibility of the invention, FIG. 4 depicts both a dual ring network 402 and a star network 404 that illustratively carry digital video to various users (subscribers) from a network manager 406. The network manager 406 controls the content server 408. Specifically, the manager 406 controls the access and transmission of digital video that is stored on a central content server 408. The content server 408 is coupled to a number of distributed neighborhood servers 4121, 4122 . . . 412n through a ring network 402. The rings are counter rotating such that data on ring 418 flows in the clockwise direction, while data on ring 420 flows in a counter clockwise direction. The data is routed from distributed server to distributed server and through the content server based upon the destination address in each packet. The content server 408 addresses the packets to each of the distributed servers 412 such that the content server 408 can propagate digital video to the distributed servers 412 in each of the neighborhoods. The distributed server receiving the packets can save or store the information and/or distribute it directly to the subscriber equipment. e.g., a set top box 422 for decoding and display to a user. The counter rotating ring network 402 operates such that if a link to the distributed server 412 should fail, then distributed server 4121 will route the information that would have been passed on the ring 420 to distributed server 4122 back through its internal switch and return the packet to server 408. As such, the dual, counter-rotating ring 402 becomes a single ring.

The low overhead MPEG-based transport packets and fixed length packets enable a very high data rate to be transmitted through such a dual, counter-rotating ring network 402. The data rates for such a system are greater than 1 gigabit per second.

The packet structure of FIG. 1 is also useful in routing packets through a "star" network 404. The network manager 406 controls the addressing of packets to a user via the destination address field. The star network 404 comprises at least one distribution node 414 and a plurality of neighborhood servers 4161, 4162 . . . 416n. The distribution node and the servers contain network switches that properly route the packets in accordance with destination address. Additional star networks can be coupled to from distribution node 414 to distribution node 414 via one or more "legs" 424 to form a "daisy chained" network of nodes.

Although various embodiments which incorporate the teachings of the present invention have been shown and described in detail herein, those skilled in the art can readily devise many other varied embodiments that still incorporate these teachings.

What is claimed is:

1. A computer-readable memory having stored thereon a computer program which, when executed by a computer, causes the computer to perform a method, comprising:
    forming a data packet; and
    using the data packet for propagating video information in a communications network, the data packet comprising:
    a header portion comprising:
        a packet synchronization field;
        a header field comprising a packet type sub-field providing indicia of a type of payload, and a continuity counter;
        a private data field associated with application specific data for facilitating payload handling; and
        a destination address field comprising a stream number sub-field to identify a data stream being sent to a node in the communications network and a node-identification sub-field capable of providing an address for a node in the communications network, the node identification sub-field contains a packet identifier that is examined by a node in the communications network;
    a payload portion comprising digital video information or internet protocol data; and
    a trailer field.

2. The computer-readable memory of claim 1, wherein the packet identifier is a 16 bit string.

3. The computer-readable memory of claim 1, wherein if the packet identifier in the node identification sub-field does not match an ID of a node examining the packet, then the packet is routed to another node.

4. The computer-readable memory of claim 1, wherein if the packet identifier in the node identification sub-field does match an ID of a node examining the packet, then the packet is to be removed from the network and processed by the node examining the packet.

5. The computer-readable memory of claim 1, wherein the stream number sub-field further comprises 12 bits.

6. The computer-readable memory of claim 1, wherein the stream number sub-field contains a value that is assigned by a destination node in the communication network to identify a data stream being sent to the node.

7. A computer-readable memory having stored thereon a computer program which, when executed by a computer, causes the computer to perform a method, comprising:
   forming a data packet; and
   using the data packet for propagating video information in a communications network, the data packet comprising:
   a header portion comprising:
       a packet synchronization field;
       a header field comprising a packet type sub-field providing indicia of a type of payload, and a continuity counter;
       a private data field associated with one or more identification codes that are associated with specific programs being transported in the packet, the one or more identification codes being associated one or more title identification codes that is compared to an expected title identification code at a node where the data packet is received to verify the correctness of the content contained in the data packet;
       a destination address field;
   a payload portion comprising:
       digital video information or interne protocol data; and
       a trailer field.

8. The computer-readable memory of claim 7, wherein one or more identification codes is a title identification code (TIC) that is associated with one or more programs being transported in the payload portion.

9. The computer-readable memory of claim 8, wherein the private data field associated with the title identification code (TIC) is used to perform stream integrity checking on a packet-by-packet basis.

10. The computer-readable memory of claim 9, wherein the private data field stores source address information if the payload portion contains IP-based packets.

11. The computer-readable memory of claim 9, wherein the private data field stores source address information if the payload contains in-band messages.

12. A computer-readable memory having stored thereon a computer program which, when executed by a computer, causes the computer to perform a method, comprising:
    processing a received data packet; and
    using the data packet for propagating video information in a communications network, the data packet comprising:
    a header portion comprising:
    a packet synchronization field;
        a header field comprising a packet type sub-field providing indicia of a type of payload, and a continuity counter;
        a private data field associated with application specific data for facilitating payload handling; and
        a destination address field comprising a stream number sub-field to identify a data stream being sent to a node in the communications network and a node-identification sub-field capable of providing an address for a node in the communications network, the node identification sub-field contains a packet identifier that is examined by a node in the communications network;
    a payload portion comprising digital video information or internet protocol data; and
    a trailer field.

13. The computer-readable memory of claim 12, wherein the packet identifier is a 16 bit string.

14. The computer-readable memory of claim 12, wherein if the packet identifier in the node identification sub-field does not match an ID of a node examining the packet, then the packet is routed to another node.

15. The computer-readable memory of claim 12, wherein if the packet identifier in the node identification sub-field does match an ID of a node examining the packet, then the packet is to be removed from the network and processed by the node examining the packet.

16. The computer-readable memory of claim 12, wherein the stream number sub-field further comprises 12 bits.

17. The computer-readable memory of claim 12, wherein the stream number sub-field contains a value that is assigned by a destination node in the communication network to identify a data stream being sent to the node.

* * * * *

UNITED STATES PATENT AND TRADEMARK OFFICE
CERTIFICATE OF CORRECTION

| | | |
|---|---|---|
| PATENT NO. | : 7,801,172 B2 | Page 1 of 1 |
| APPLICATION NO. | : 10/946393 | |
| DATED | : September 21, 2010 | |
| INVENTOR(S) | : Christopher W. B. Goode et al. | |

It is certified that error appears in the above-identified patent and that said Letters Patent is hereby corrected as shown below:

Column 5, line 7, delete "302" and insert -- 302, --, therefor.

Column 7, line 32, in claim 7, delete "interne" and insert -- internet --, therefor.

Signed and Sealed this

Twenty-third Day of November, 2010

David J. Kappos
*Director of the United States Patent and Trademark Office*